US006865168B1

United States Patent
Sekine (10) Patent No.: US 6,865,168 B1
(45) Date of Patent: Mar. 8, 2005

(54) MULTIPLEXING COMMUNICATION SYSTEM

(75) Inventor: Kiyoki Sekine, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/257,917

(22) Filed: Feb. 26, 1999

(30) Foreign Application Priority Data

Apr. 28, 1998 (JP) ........................................ H10-118452

(51) Int. Cl.⁷ ............................................... H04B 1/00
(52) U.S. Cl. ....................... 370/335; 370/342; 370/441; 455/13.4; 455/127; 455/136; 455/138; 455/522
(58) Field of Search ................................ 370/228, 311, 370/329, 331–333, 342, 441; 455/13.4, 38.3, 122, 123, 125, 127, 136, 138, 522

(56) References Cited

U.S. PATENT DOCUMENTS

| | | | |
|---|---|---|---|
| 5,566,165 A | * 10/1996 | Sawahashi et al. | 370/342 |
| 5,574,983 A | * 11/1996 | Douzono et al. | 455/69 |
| 5,751,739 A | * 5/1998 | Seshadri et al. | 714/746 |
| 5,818,871 A | * 10/1998 | Blakeney et al. | 375/220 |
| 5,930,706 A | * 7/1999 | Raith | 455/422 |
| 6,085,107 A | * 7/2000 | Persson et al. | 455/436 |
| 6,118,983 A | * 9/2000 | Egusa et al. | 455/69 |
| 6,119,018 A | * 9/2000 | Kondo | 455/522 |
| 6,226,316 B1 | * 5/2001 | Schilling et al. | 375/142 |
| 6,310,868 B2 | * 10/2001 | Uebayashi et al. | 370/335 |
| 6,335,924 B1 | * 1/2002 | Yano et al. | 370/335 |

OTHER PUBLICATIONS

TIA/EIA/IS–95 Mobile Station. Base Station Compatibility Standard Dual –Mode Wideband Spread Spectrum Cellular System. PP7–13–7–16, PP7–33–7–38 published in US in 1995.

CDMA. Principles of Spread Spectrum Communication. PP113–119 Authored by Andrew J. Viterbi, Addison Wesley and Published in US in 1995.

NTT DoCoMo Technical Journal, Oct., 1996. PP9–13 PP19–21 PP53 Authored by Koji Ohno, Mamoru Sawahashi Tomohiro Dohi, Akihiro Higashi, Koichi Okawa and published in Japan in 1996.

* cited by examiner

Primary Examiner—Steven Nguyen
Assistant Examiner—Roberta Stevens
(74) Attorney, Agent, or Firm—Rabin & Berdo, P.C.

(57) ABSTRACT

A communication system includes a first communication station for transmitting first data and second data at a first transmission power level and a second transmission power level, respectively, and a second communication station for receiving the first data and the second data transmitted from the first communication station as a reception signal. The second communication station generates transmission power control information based on the received first and second data, and transmits the generated transmission power control information to the first communication station. The first communication station receives the transmission power control information from the second communication station, and controls the first transmission power level and the second transmission power level independently of each other based on the transmission power control information.

43 Claims, 5 Drawing Sheets

MULTIPLEXING COMMUNICATION SYSTEM

BACKGROUND OF THE INVENTION

1. Field of Invention

The present invention relates to a multiplexing communication system suitable for a mobile multiplexing communication system in which a code-dividing multi-access method is applied as a multiplexing method, such as a personal communication system (PCS), a digital cellular system or the like.

2. Description of Related Art

The following publications introduce conventional techniques related to such a communication system.

1. Mobile Station—Base Station Compatibility Standard for Dual-Mode Wideband Spread Spectrum Cellular System, IS-95;
2. CDMA—Principles of Spread Spectrum Communication, Andrew J. Viterbi, Addison Wesley, 1995; and
3. NTT DoCoMo Technical Journal Vol. 4, No. 3.

In Publication 1, a transmission method for a plurality of series of data used in CDMA communication is provided. In Publication 1 describes a transmitter that takes a portion of the power control data for each mobile station and transmits it on a communication channel in a multiplexed manner. The transmitter assigns the connection control data to frames of transmission audio data. It is noted that the transmitter described in Publication 1 uses a part of one data region corresponding to 168 bits for audio data and uses the remaining part of the same region for connection control data.

The method of distributing audio data and connection control data in a single data region is determined based on the transmission rate of the audio data. Assuming the transmission rate is 9600 bits per second (bps), there are five distribution methods: a method in which only the audio data is transmitted; a method in which each of the audio data and the connection control data constitutes a half of the transmission data; a method in which the audio data and connection control data constitute ¼ and ¾ of the transmission data, respectively; a method in which the audio data and the connection control data constitute ⅛ and ⅞ of the transmission data, respectively; and a method in which only the connection control data constitute all of the transmission data. In these five distribution methods, the number of audio data bits and the number of connection control data bits in each frame are 168 and 0; 80 and 88; 40 and 128; 16 and 152; and 0 and 168, respectively. By using these five methods, i.e., frame formats, the audio data and the connection control data are transmitted while the transmission of the connection control data is adjusted based on the amount of information included in the audio data.

Publication 2 provides an example of transmission power control. In the communication system described in Publication 2, open-loop power control is performed based on the output of an automatic gain control circuit (hereinafter, referred to as an AGC circuit). Also, closed-loop power control is performed so as to adjust the transmission power level in response to instructions from another communication station to adjust the transmission power level. More specifically, the aforementioned method of power control is described as a method of power control for reverse-link data. In this method of power control for reverse-link data, a mobile station increases and decreases the transmission power level in response to power control bits "0" and "1", respectively, that are sent from a base station.

As described above, in the CDMA communication systems described in each of Publications 1 and 2, both the audio data and the connection control data are logically mapped on the same physical frame, and open-loop power control and closed-loop power control are performed for the same physical frame.

Therefore, in a case where the audio data, which is called the first data, is required to have a communication quality different from that of the connection control data, which is called the second data, transmission power control has to be performed so as to achieve the higher of the two communication qualities.

In addition, Publication 1 provides that first and second audio data are transmitted instead of audio data and connection control data.

Publication 3 describes a high-speed transmission technique, which uses orthogonal symbol channels. In this transmission technique, a data series having a higher transmission rate is transmitted using a plurality of physical channels that are divided by orthogonal symbol channels. In this transmission technique, single path power control is performed for the plurality of physical channels, because the plurality of physical channels carry data having the same quality.

However, when there are a plurality of series of logical data with different required qualities, in order to transmit physical data obtained from the plurality of series of logical data, a new power controller is required in order to achieve all the required qualities while preventing excessive power transmission.

In the case of a data series for which re-try operation is not performed, such as telephone call data, when the required quality of the data series is not achieved, noises may interfere with the data. In this case, the audio content of the telephone call is not correctly judged at the receiver end. In the case of a data series for which re-try operation is performed, such as connection control data, when the required quality is not achieved, overhead due to the re-try operation may be large, thereby decreasing the transmission rate. Thus many problems may arise when the required qualities of any of the data series is not achieved.

On the other hand, if excessive power transmission is permitted in a CDMA communication system, the excessive power may interfere with communication between other users, leading to a decrease in the number of simultaneous connections possible at one base station. Such interference accounts for most of the noise occurring in communication signals between other users.

SUMMARY OF THE INVENTION

Therefore, the present invention aims to provide a communication system that can solve the aforementioned problems. This object can be accomplished by the combinations of features recited in the independent claims. In addition, the dependent claims recite further advantageous embodiments of the present invention.

According to the first aspect of the present invention, a communication station for transmitting first data and second data is provided, which includes: an encoder for coding the first data and the second data; a multiplexer for multiplexing the coded first data and the coded second data; a transmitter for transmitting the first data and the second data that are multiplexed with each other to another communication station, the first data and the second data being transmitted at a first transmission power level and a second transmission power level, respectively; and a transmission power controller for receiving transmission power control information from the other communication station and for controlling the first transmission power level and the second transmission power level independently of each other.

In an embodiment of the present invention, the transmission power control information includes first and second control bits. The first communication station changes both a first gain for the first data and a second gain for the second data by a first value based on the first control bit, and changes either the first gain or the second gain by a second value based on the second control bit. The first value may be larger than the second value. In a preferred embodiment, the first value is 1 dB and the second value is 0.1 dB.

According to the second aspect of the present invention, a communication station for receiving first data and second data transmitted from another communication station is provided, in which the first data and the second data are transmitted at a first transmission power level and a second transmission power level, respectively. The communication station includes: a receiver for receiving the first data and the second data; a processor for decoding the first data and the second data; a control information generator for generating transmission power control information based on the first data and the second data received by the receiver, the transmission power control information serving to control the first transmission power level and the second transmission power level independently of each other; and a transmitter for transmitting the transmission power control information to the other communication station.

In an embodiment of the present invention, the transmission control information is generated in such a manner as to reduce the difference between a first difference between the required received quality and the actual received quality of the first data and a second difference between the required received quality and the actual received quality of the second data. Preferably, the required received quality and the actual received quality of both the first data and the second data may be represented by the frame error rate. Alternatively, they may be represented by the signal-to-noise ratio.

In another embodiment of the present invention, the transmission power control information includes a first control bit generated based on the first data and a second control bit generated based on both the first data and the second data, and the first control bit is transmitted to the other communication station more frequently than the second control bit. Preferably, the first control bit is transmitted at intervals of 1.25 ms while the second control bit is transmitted at intervals of 80 ms. Moreover, it is preferable that the second control bit is transmitted in such a manner that the first control bit is replaced with the second control bit at intervals of 80 ms. The second control bit may be transmitted in synchronization with the start of a frame of the first data. Alternatively, the second control bit may be transmitted at a timing corresponding to a portion of a frame other than the header portion or the end portion.

According to the third aspect of the present invention, a communication station for transmitting first data and second data on reverse-link and for receiving third data and fourth data on forward-link in response to the first data and the second data is provided. The communication station includes: an encoder for coding the first data and the second data; a multiplexer for multiplexing the coded first data and the coded second data; a transmitter for transmitting the first data and the second data that are multiplexed with each other to another communication station, the first data and the second data being transmitted at a first transmission power level and a second transmission power level, respectively; a receiver for receiving the third data and the fourth data; a processor for separating transmission power control information from the third data and the fourth data; a transmission power controller for controlling the first transmission power level and the second transmission power level independently of each other, based on the separated transmission power control information; and a control information generator for generating further transmission power control information based on the reception states of the third data and the fourth data, the further transmission power control information serving to control the third transmission power level and the fourth transmission power level independently of each other. In this communication station, the further transmission power control information is transmitted together with the first data and the second data.

According to the fourth aspect of the present invention, a communication system is provided that includes: a first communication station for transmitting first data and second data at a first transmission power level and a second transmission power level, respectively; and a second communication station for receiving the first data and the second data transmitted from the first communication station. In this communication system, the second communication station generates transmission power control information based on the received first and second data, and transmits the generated transmission power control information to the first communication station. The first communication station receives the transmission power control information from the second communication station, and controls the first transmission power level and the second transmission power level independently of each other based on the transmission power control information.

In one embodiment of the present invention, the first communication station includes a transmission power controller that controls a first gain of the first data and a second gain of the second data independently of each other, thereby controlling the first transmission power level and the second transmission power level.

In another embodiment of the present invention, the transmission power control information includes first and second control bits, and the transmission power controller of the first communication station changes both the first gain and the second gain by a first value based on the first control bit, and changes either the first gain or the second gain by a second value based on the second control bit. Preferably, the first value is larger than the second value. The first value and the second value may be 1 dB and 0.1 dB, respectively.

In still another embodiment of the present invention, the second communication station generates the transmission power control information in such a manner as to reduce the difference between a first difference between the required received quality and the actual received quality of the first data and a second difference between the required received quality and the actual received quality of the second data.

In still another embodiment of the present invention, the required received quality and the actual received quality of both the first data and the second data are represented by the frame error rate. Alternatively, the required received quality and the actual received quality of both the first data and the second data may be represented by the signal-to-noise-ratio.

In still another embodiment of the present invention, the second communication station generates the first control bit based on the first data and the second control bit based on both the first data and the second data, and transmits the first control bit to the first communication station more frequently than the second control bit. It is preferable that the first control bit is transmitted at intervals of 1.25 ms, while the second control bit is transmitted at intervals of 80 ms. Moreover, it is more preferable that the second control bit is transmitted in such a manner that the first control bit is replaced with the second control bit at intervals of 80 ms. The second control bit may be transmitted in synchronization with the start of a frame of the first data. Alternatively, the second control bit may be transmitted at a timing corresponding to a portion of a frame other than the header portion or the end portion.

In still another embodiment of the present invention, the second communication station transmits third data and fourth data at a third transmission power level and a fourth transmission power level, respectively, to the first communication station. The first communication station generates further transmission control information for controlling the third transmission power level and the fourth transmission power level. The second communication station controls the third transmission power level and the fourth transmission power level independently of each other based on the further transmission power control information from the first communication station.

It is preferable that the second communication station transmit the transmission power control information to the first communication station in such a manner that the transmission power control information is conveyed with either the third data or the fourth data. In addition, it is also preferable that the first communication station transmit the further transmission power control information for the third data and the fourth data to the second communication station in such a manner that the further transmission power control information is conveyed with either the first data or the second data.

In still another embodiment of the present invention, the second communication station controls a third gain of the third data and a fourth gain of the fourth data independently of each other, thereby controlling the third transmission power level and the fourth transmission power level.

In still another embodiment of the present invention, the further transmission power control information generated by the first communication station includes third and fourth control bits. The second communication station changes both the third gain and the fourth gain by a third value based on the third control bit, and changes either the third gain or the fourth gain by a fourth value based on the fourth control bit. It is preferable that the third value be larger than the fourth value. The third value and the fourth value may be 1 dB and 0.1 dB, respectively.

In still another embodiment of the present invention, the further transmission control information is generated to reduce the difference between a third difference between the required received quality and the actual received quality of the third data and a fourth difference between the required received quality and the actual received quality of the fourth data.

The required received quality and the actual received quality of each set of data may be represented by the frame error rate. Alternatively, they may be represented by the signal-to-noise ratio.

In still another embodiment of the present invention, the first communication station generates the third control bit based on the third data and the fourth control bit based on both the third data and the fourth data, and transmits the third control bit to the second communication station more frequently than the fourth control bit. It is preferable that the third control bit be transmitted at intervals of 1.25 ms, while the fourth control bit is transmitted at intervals of 80 ms. Moreover, it is preferable that the fourth control bit be transmitted in such a manner that the third control bit is replaced with the fourth control bit at intervals of 80 ms. The fourth control bit may be transmitted in synchronization with the start of a frame of the first data. Alternatively, the fourth control bit may be transmitted at a timing corresponding to a portion of a frame other than the header portion or the end portion.

In still another embodiment of the present invention, both the first data and the third data are message data, and both the second data and the fourth data are control data for the message data. Alternatively, both the second data and the fourth data may be message data, while both the first data and the third data are control data for the message data.

In this way, according to the present invention, transmission power control is performed independently for each of a plurality of series of logical data with different required qualities. Therefore, a multiplexing communication system which allows all the required qualities to be achieved without excessive power transmission is realized.

It is noted that this summary of the invention does not describe all of the features necessary for the present invention. The sub-combinations of the features mentioned above also constitute part of the invention.

DETAILED DESCRIPTION OF THE INVENTION

Hereinafter, a preferred embodiment of the present invention will be described with reference to the drawings. It should be noted that the claimed invention is not limited to the preferred embodiment described below. Also, it should be noted that not all of the features described in the embodiment described below are always necessary for solving the aforementioned problems.

A multiplexing communication system according to the present invention will be described using an example of a CDMA mobile communication system.

(A) Basic Configuration of a Mobile Communication System of the Present Invention:

The mobile communication system of the present invention includes two communication stations, i.e., first and second communication stations. The first communication station transmits the first data series and the second data series. The second communication station receives the transmitted first and second data series, and obtains the relative value of the reception signal-to-noise ratio (hereinafter, referred to as a relative SNR) for each data series. The relative SNR is obtained from the actually received quality of each data series by a calculation using, as a standard, the decibel value of the reception signal-to-noise ratio calculated from the required quality of each data series, the required quality being determined by the certain properties of each data series. Hereinafter, the relative SNR for the first data series is referred to as the first relative SNR, while the relative SNR for the second data series is referred to as the second relative SNR. In the mobile communication system described below, closed-loop power control is performed in such a manner as to reduce the absolute difference between the first relative SNR and the second relative SNR.

With this configuration, the communication system of the present invention allows all the required qualities of the plurality of series of logical data to be achieved while suppressing excessive transmission power levels, even in the case where the different series of logical data to be transmitted have different required qualities.

Figure 1:
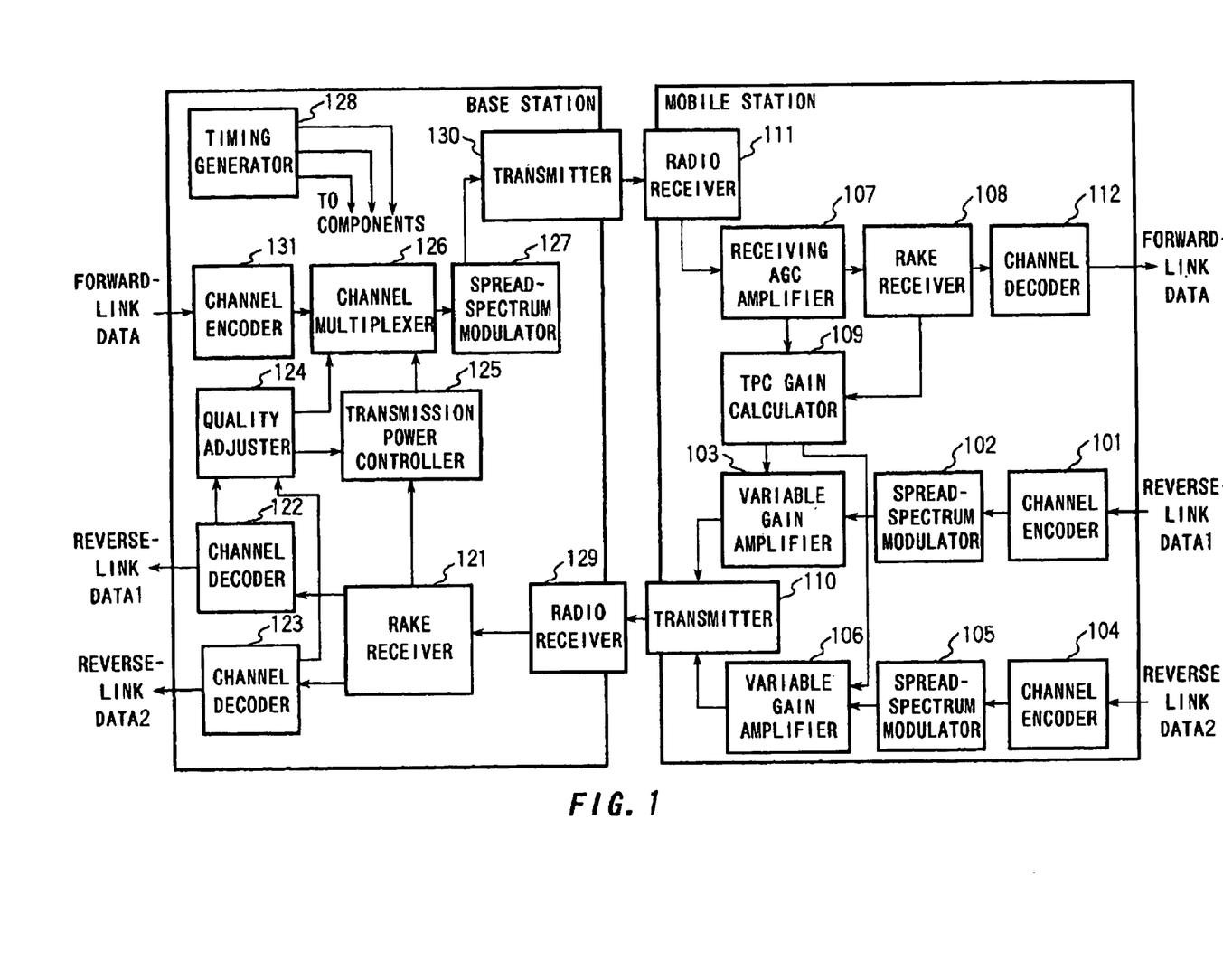
FIG. 1 is a block diagram showing the structure of a communication system according to an embodiment of the present invention.

(B) The Structure of the Communication System According to an Embodiment of the Present Invention FIG. 1 illustrates the specific structure of the mobile communication system in the present embodiment. In FIG. 1, only components having functions related to the concept of the present invention are shown, while other components are not shown. Moreover, FIG. 1 illustrates merely a schematic structure used to explain the present invention and therefore the actual circuit structure of the invention is not limited to the structure shown in FIG. 1.

The mobile communication system in the present embodiment includes a mobile station and a base station, as shown in FIG. 1. The mobile station and the base station serve as the first communication station and the second communication station, respectively. The mobile station transmits two series of data to the base station via a reverse-link. The transmission power levels at which the two data series are transmitted are controlled independently of each other, on the basis of the reception conditions of the two series of data.

(B-1) The Structure of the Mobile Station:

Now, the structure of the mobile station will be described, with reference to FIG. 1. First, the transmission portion of the mobile station will be described. The transmission portion includes a channel encoder 101, a spread-spectrum modulator 102 and a variable gain amplifier 103, all of which are provided for the first data series, and a channel encoder 104, a spread-spectrum modulator 105 and a variable gain amplifier 106, all of which are provided for the second data series, and a transmitter 110 which is used for both the first data series and the second data series.

The channel coders 101 and 104 perform coding of the first data series and coding of the second data series independently of each other, based on the required communication qualities of the respective data series, so as to output the coded first data series and the coded second data series as first channel coded data and second channel coded data, respectively. It is noted that each of the channel coders 101 and 104 performs error correction coding or the like as the coding operation on the corresponding data series.

Each of the spread-spectrum modulators 102 and 105 receives the corresponding coded data, performs spread-modulation for the corresponding coded data, and then outputs the resultant data to the corresponding one of the variable gain amplifiers 103 and 106.

Figure 2:
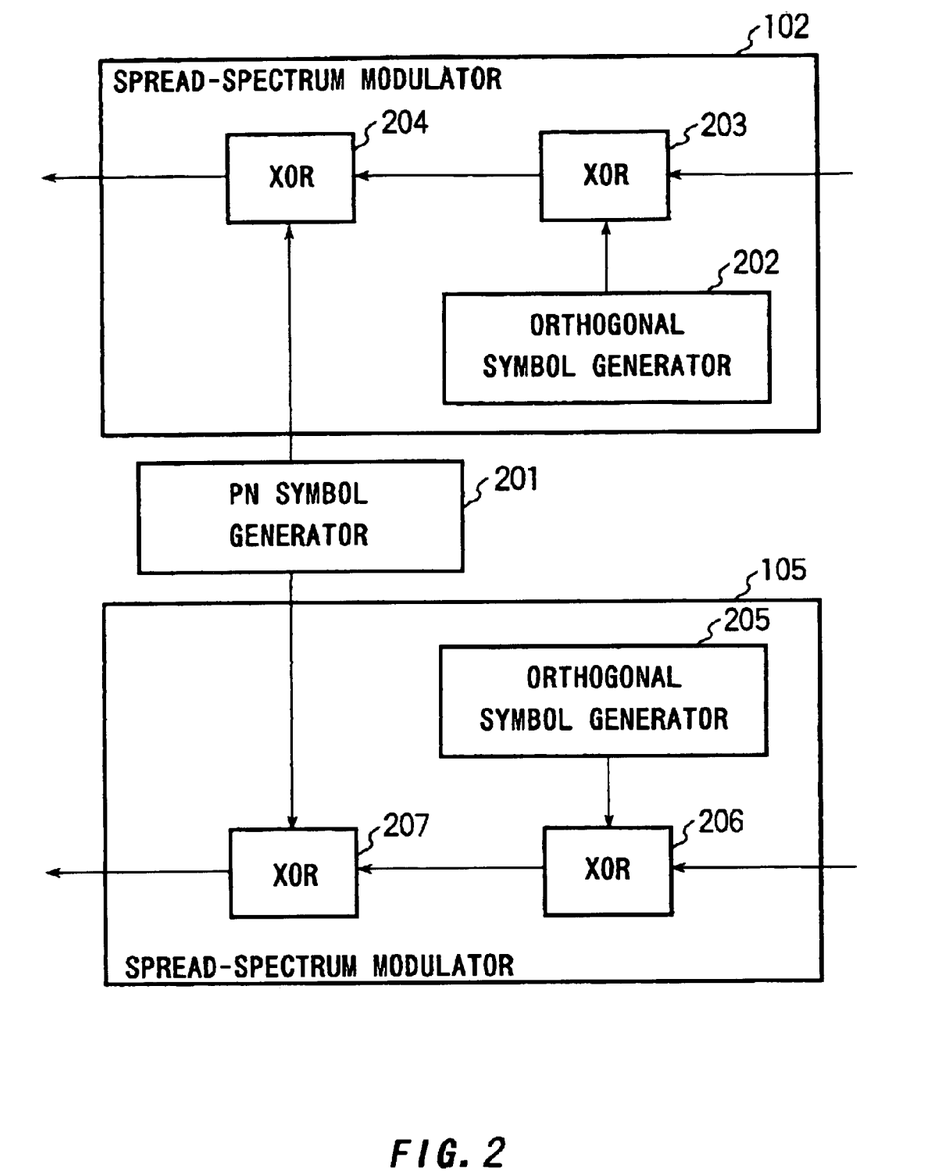
FIG. 2 is a block diagram showing the structure of a spread-spectrum multiplexer.

An example of the structure of each spread-spectrum modulator is shown in FIG. 2. Each spread-spectrum modulator includes an orthogonal symbol generator that generates orthogonal symbols specific to the corresponding coded data, and two XOR operators.

As shown in FIG. 2, the first XOR operators 203 and 205 receive the orthogonal symbols from the orthogonal symbol generators 202 and 205, respectively, while the second XOR operators 204 and 207 receive PN (pseudo noise) symbols from a PN symbol generator 201.

With this configuration, the first channel coded data and the second channel coded data supplied from the channel coders 101 and 104 to the spread-spectrum modulators 102 and 105, respectively, are transformed into orthogonal signals using the orthogonal symbols specific to the respective data series. Then, the orthogonal signals are subjected to spread-spectrum modulation using the PN symbols that are spread-spectrum symbols specific to the base station, and are output to the variable gain amplifiers 103 and 106, respectively, as shown in FIG. 1.

The gains of the variable gain amplifiers 103 and 106 can be changed independently of each other, based on gain values that are individually set by a transmission power control (TPC) gain calculator 109. Therefore, each of the variable gain amplifiers 103 and 106 outputs the spread-spectrum modulated data, which has been amplified based on the gain specific to the amplifier 103 or 106, to the transmitter 110.

The transmitter 110 multiplexes the spread-spectrum modulated data thus amplified, and transmits the multiplexed data to the base station via a radio-link.

Next, the reception portion of the mobile station will be described. The reception portion includes a receiving automatic gain control (AGC) amplifier 107, a RAKE receiver 108, a transmission power control (TPC) gain calculator 109, a radio receiver 111, and a forward-link channel decoder 112.

The radio receiver 111 detects a signal received via the radio-link. The received signal thus detected is supplied to the receiving AGC amplifier 107. The receiving AGC amplifier 107 makes the power of the received signal uniform and outputs the received signal to the RAKE receiver 108.

The RAKE receiver 108 performs reverse spread-spectrum modulation for the received signal that has been subjected to multi-path synthesis so as to separate the received data on the forward-link from a series of transmission power control (TPC) bits including quality modification (MDF) bits. The received data carried on the forward-link is output to the channel decoder 112. The series of TPC bits are output to the TPC gain calculator 109.

The channel decoder 112 performs a de-interleaving operation and an error correcting operation, such as a Viterbi decoding operation. That is, the channel decoder 112 terminates the radio interface.

The TPC gain calculator 109 calculates TPC gains appropriate for the variable gain amplifiers 103 and 106, based on the AGC signal supplied from the receiving AGC amplifier 107 and the series of TPC bits supplied from the RAKE receiver 108. The details of the calculation performed by the TPC gain calculator 109 will be described later.

The AGC signal is used for open-loop transmission power control while the series of TPC bits are used for closed-loop transmission power control.

The AGC signal compensates for the center value of the variation, the center value changing at a rate of about 3 Hz, and is normalized by an appropriate compressing and expanding operation. Hereinafter, this value, represented in units of decibels, is referred to as the open-loop gain.

The series of TPC bits contain not only TPC bits but also quality modification (MDF) bits, both of which are used for controlling the increase and decrease of the closed-loop gain values. A TPC bit corresponds to an instruction to increase or decrease the closed-loop gain values for both the first data series and the second data series. More specifically, both the closed-loop gain value for the first data series and the closed-loop gain for the second data series are increased from their respective current gain values when the TPC bit is "0", while they are decreased from their respective current gain values when the TPC bit is "1". In this embodiment, the TPC bit is supplied at intervals of 1.25 ms, and the increment and the decrement that are based on the TPC bit are set to be 1.0 dB.

A quality modification (MDF) bit corresponds to an instruction to increase or decrease the closed-loop gain value for only the first data series. In this embodiment, the MDF bit is supplied at intervals of 80 ms. The closed-loop gain value for the first data series is increased from the current value when the MDF bit is "0", while it is decreased from the current value when the MDF bit is "1". The increment and the decrement that are based on the MDF bit are set to be equal, and are smaller than those based on the TPC bit. In this embodiment, the increment and the decrement based on the MDF bit are set to be 0.1 dB.

It is noted that, in this embodiment, the MDF bit has no effects on the closed-loop gain value for the second data series. In other words, the closed-loop gain value for the second data series remains unchanged irrespective of the value of the MDF bit.

The TPC gain calculator 109 calculates the TPC gain for each data series from the gain value adjusted on the basis of the aforementioned TPC and MDF bits as follows:

$TPC$ gain=(initial gain at the maximum data rate)+(open-loop gain)+(closed-loop gain)+10 $\log_{10}$(transmission data rate/maximum data rate)

The TPC gains thus calculated for the first data series and the second data series are supplied to the variable gain amplifiers 103 and 106 that correspond to the first data series and the second data series, respectively. Please note that the use of the quality modification (MDF) bit as described in this embodiment allows a plurality of data series having different data rates or different required qualities to be transmitted at optimum transmission power levels.

(B-2) The Structure of the Base Station:

The reception portion of the base station includes a radio receiver 129, a RAKE receiver 121, a channel decoder 122 provided for the first data series and a channel decoder 123 provided for the second data series.

The radio receiver 129 detects a reception signal via the radio-link and outputs the reception signal to the RAKE receiver 121. The reception signal is a signal transmitted from the mobile station that includes the first and second data series.

The RAKE receiver 121 performs multi-path synthesis for the reception signal, and then performs reverse spread-spectrum modulation for the resultant signal so as to separate data corresponding to the first data series from data corresponding to the second data series. The data corresponding to the first data series is supplied to the channel decoder 122, while the data corresponding to the second data series is supplied to the channel decoder 123. In addition, the RAKE receiver 121 calculates the ratio of the reception signal to the interference (hereinafter, referred to as RAKE SIR) for the first data series (not for the second data series) from the reception signal. The obtained RAKE SIR is output to a transmission power controller 125. In this embodiment, the RAKE SIR is updated at intervals of 1.25 ms, where one frame corresponds to 20 ms.

The channel decoders 122 and 123 perform a decoding operation, such as error correction, for the respective reception data that are separated by the RAKE receiver 121, and then output the decoding results as decoded data to a circuit (not shown) provided after the channel decoders 122 and 123. Each channel decoder 122 or 123 adds a frame check series, such as a cyclic redundancy check (hereinafter, referred to as CRC) series to every frame of the data so as to check the presence of frame error. In addition, each channel decoder 122 or 123 performs re-try control or the like, if necessary. The results of the CRC are output from the channel decoders 122 and 123 to a quality adjuster 124.

The transmission portion of the base station includes the quality adjuster 124, the transmission power controller 125, a channel multiplexer 126, a spread-spectrum modulator 127, a timing generator 128, a radio transmitter 130 and a channel coder 131 for the forward-link data. The above components of the transmission portion operate based on timing signals supplied from the timing generator 128.

The quality adjuster 124 counts the number of error frames per unit time for the respective data series from the results of the frame error check supplied from the channel decoders 122 and 123, and thus measures the frame error rate (hereinafter, referred to as FER).

Then, the quality adjuster 124 obtains a target SIR for the first data series and the quality modification (MDF) bit based on the measurement result, and outputs the target SIR for the first data series to the transmission power controller 125 while outputting the MDF bit to the channel multiplexer 126.

In this embodiment, the target SIR is output at intervals of 2 seconds and the MDF bit is output at intervals of 80 ms.

More specifically, the quality adjuster 124 obtains the target SIR as follows. For example, when there exist frame errors in the first data series received during a period of 2 seconds, the quality adjuster 124 updates the currently held target SIR by adding a certain constant value to the current target SIR.

Similarly, when there is no frame error in the first data series received during a period of 2 seconds, the quality adjuster 124 updates the current target SIR by subtracting the certain constant value from the current target SIR.

On the other hand, the quality adjuster 124 obtains the other output, i.e., the MDF bit, in the following manner.

Figure 3A:
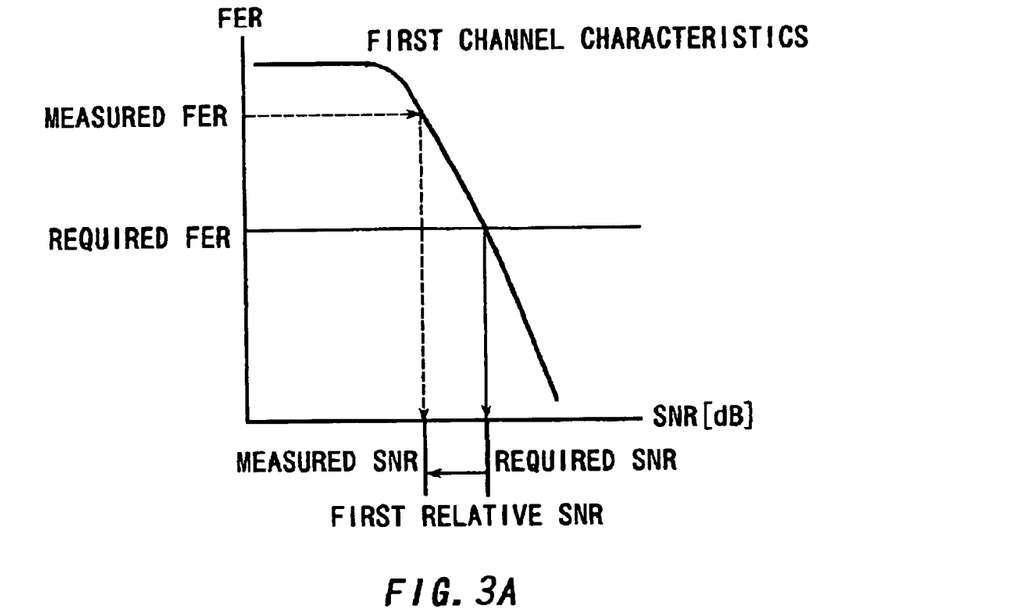
FIGS. 3A and 3B are graphs showing FER-SNR characteristics curves used for explaining a principle of setting the relative SNR.
Figure 3B:
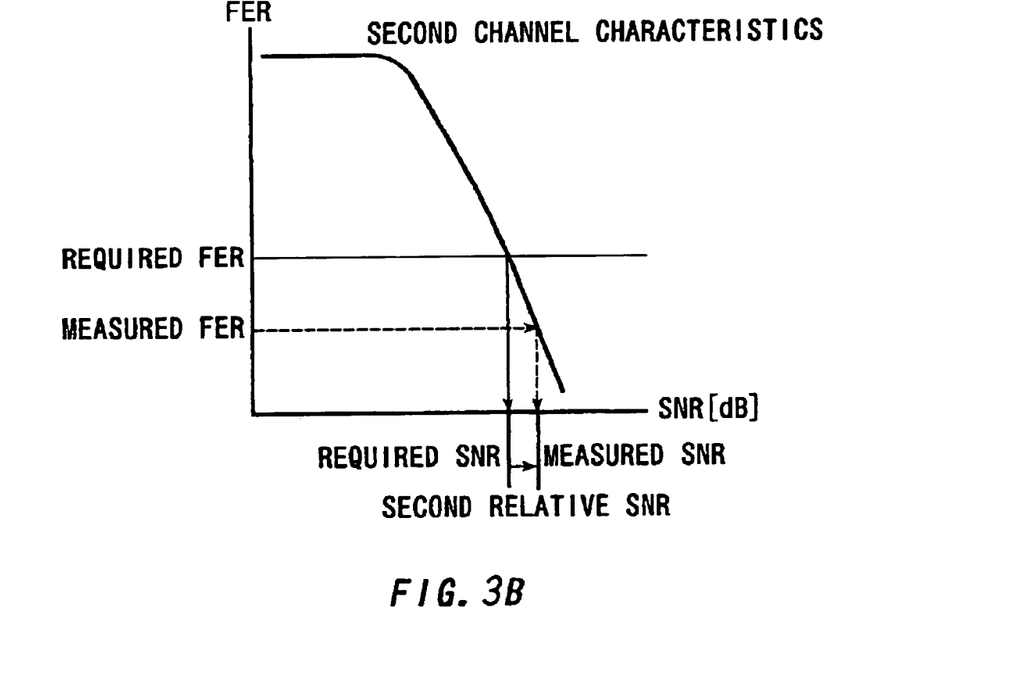

FIGS. 3A and 3B show FER-SNR characteristics for the first data series and the second data series, respectively. The quality adjuster 124 stores data that specifies a curve representing the FER-SNR characteristics for each data series. Alternatively, the quality adjuster 124 may store approximated data obtained by approximating values on the FER-SNR characteristic curve. In either case, this data is stored in the quality adjuster 124 in the form of a table, for example. The quality adjuster 124 then calculates the MDF bit by the following three steps, using this stored data.

In the first step, the quality adjuster 124 obtains an FER value that is theoretically determined by a property of each data series (referred to as a required FER value) and an SNR value required for realizing the required FER value (referred to as a required SNR value). In the second step, the quality adjuster 124 calculates an average value of an actual FER during a time period corresponding to the required FER value based on the results of frame errors for the respective series of data, which are supplied from the channel decoders 122 and 123, so as to obtain a measured FER value. Finally, in the third step, the quality adjuster 124 obtains a measured SNR value corresponding to the measured FER value obtained in the second step.

In this embodiment, the difference obtained by subtracting the required SNR value from the measured SNR value is called the relative SNR value; and the relative SNR values for the first data series and the second data series are called the first relative SNR value and the second relative SNR value, respectively.

After the relative SNR values for the first and second data series are obtained in the aforementioned way, the quality adjuster 124 generates an MDF bit based on a certain relationship between the first relative SNR value and the second relative SNR value. In this embodiment, the relationship used is the difference obtained by subtracting the second relative SNR from the first relative SNR (hereinafter, referred to as the relative SNR difference).

In this embodiment, the quality adjuster 124 outputs an MDF bit of "1", which corresponds to the instruction for the mobile station to decrease the transmission power level, when the relative SNR difference is 0 or more, and the quality adjuster 124 outputs an MDF bit of "0", which corresponds to the instruction for the mobile station to increase the transmission power level, when the relative SNR difference has a negative value, i.e., a value less than 0. The MDF bit output from the quality adjuster 124 is supplied to the channel multiplexer 126.

As for the other output of the quality adjuster 124, i.e., the target SIR value, it is supplied to the transmission power controller 125. The transmission power controller 125 compares the target SIR value with the RAKE SIR value for the first data series supplied from the RAKE receiver 121, and obtains the transmission power control (TPC) bit by calculation.

The transmission power controller 125 outputs a TPC bit of "0", which corresponds to the instruction for the mobile station to increase the transmission power level, when the RAKE SIR value is smaller than the target SIR value, and the transmission power controller 125 outputs a TPC bit of "1", corresponding to the instruction for the mobile station to decrease the transmission power level, when the RAKE SIR value is equal to or larger than the target SIR value. The TPC bit output from the transmission power controller 125 is also supplied to the channel multiplexer 126.

The channel multiplexer 126 also receives the output of the channel coder 131. The channel coder 131 is a circuit that performs a coding operation for the forward-link data and that outputs the coded data to the channel multiplexer 126. In the channel coder 131, an error correction coding operation or the like is performed as the coding operation, as in the channel coders 101 and 104 of the mobile station.

In this way, the channel multiplexer 126 receives the MDF bit from the quality adjuster 124, the TPC bit from the transmission power controller 125 and the coded data from the channel coder 131. The channel multiplexer 126 multiplexes the MDF bit and the TPC bit with the coded data, and then outputs the resultant data to the spread-spectrum modulator 127. In this embodiment, the TPC bit is assigned to the coded data at intervals of 1.25 ms. The TPC bit is replaced with the MDF bit at intervals of 80 ms.

The spread-spectrum modulator 127 performs spread-spectrum modulation for the data output from the channel multiplexer 126 and then outputs the modulated data to the radio transmitter 130. The modulated data is transmitted from the radio transmitter 130 via the radio-link to the mobile station.

Figure 4:
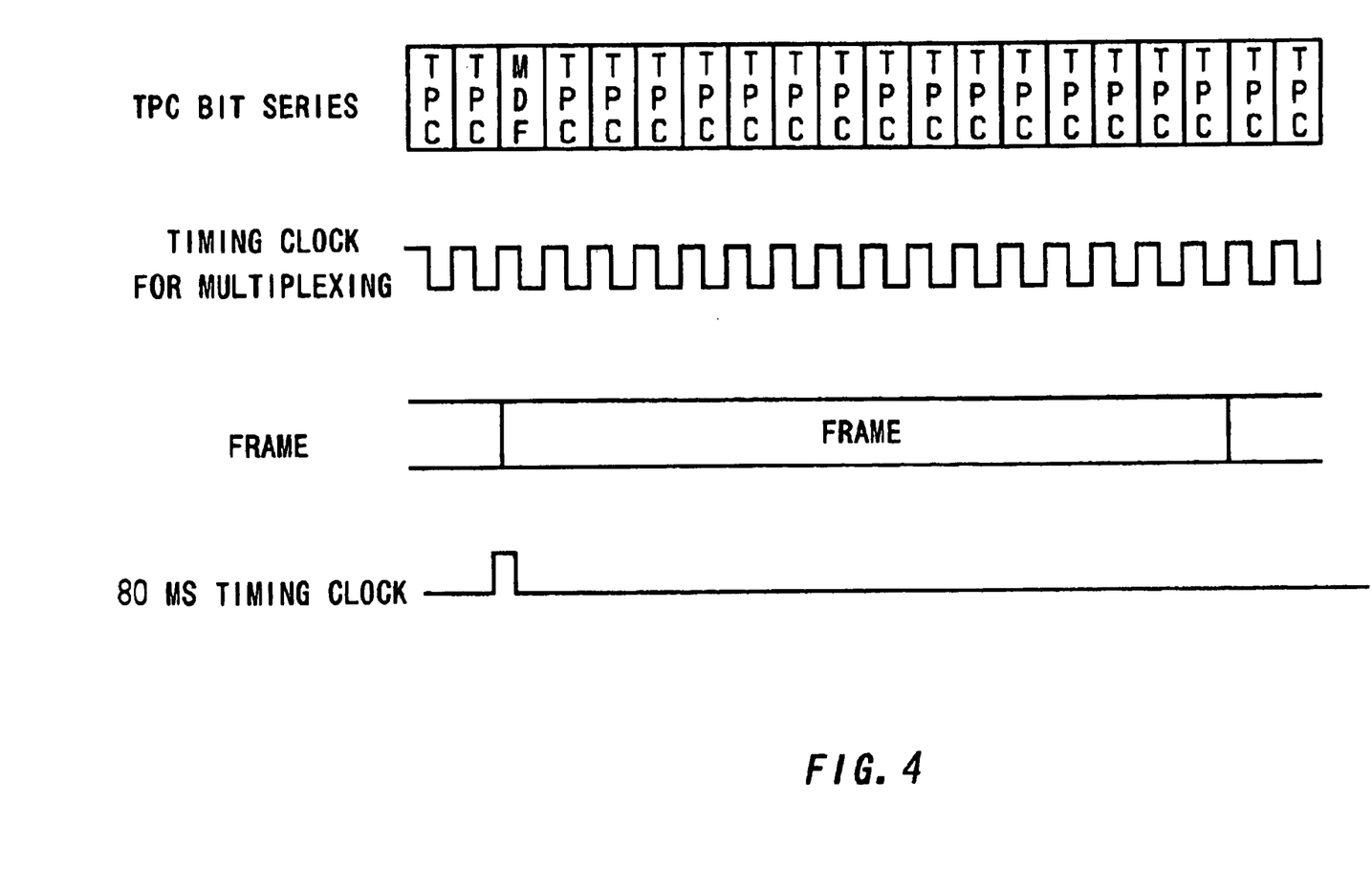
FIG. 4 is a diagram schematically showing transmission timings of a transmission power control (TPC) bit and a quality modification (MDF) bit.

FIG. 4 schematically shows the transmission timings of the TPC bit and the MDF bit. The first row corresponds to a TPC bit series (including both the TPC bit and the MDF bit) that is separated from the message data and the control data. The TPC bit series is transmitted while being inserted into the frames.

In FIG. 4, the insertion timing of each bit into a single frame is schematically shown. The third row shows the duration of a single frame, which corresponds to 20 ms in this embodiment. The TPC bit is inserted into the frames at intervals of 1.25 ms in synchronization with the rise of the clock signal for multiplexing, as shown at the second row in FIG. 4. The insertion interval of the TPC bit is determined based on the fact that the reception state actually changes about every 1.25 ms. The clock signal for multiplexing is generated, for example, based on the 80 ms timing clock as shown at the bottom row in FIG. 4.

In this embodiment, both the clock signal for multiplexing and the 80 ms timing clock are generated by the timing generator 128 so that the 80 ms timing clock rises once during a period corresponding to a duration of four frames. In this embodiment, the rising timing of the 80 ms timing clock is synchronized with the start of the first frame of the four frames.

The MDF bit is transmitted at intervals of 80 ms, as described before. The MDF bit is inserted into the frames in synchronization with the 80 ms timing clock so that the TPC bit is replaced with the MDF bit. Therefore, as shown in FIG. 4, the MDF bit is inserted in the leading portion of the frame in this embodiment.

However, the transmission timing of the MDF bit (i.e., the position in the frame at which the MDF bit is inserted) is not limited the leading portion of the frame. The transmission timing of the MDF bit is determined based on various factors. For example, the leading portion or the last portion of the frame contains important information, such as header information for the message data or control codes. Therefore, in order to prevent such important information from being damaged, it is preferable to insert the MDF bit so as to have no effect on this important information, for example, to insert the MDF bit in the middle portion of an audio data portion of the frame.

(C) Operation of the Transmission Power Control in this Embodiment:

Finally, the operations of the whole mobile communication system including the mobile station and the base station in this embodiment will be described. In the following description, it is assumed that the communication between the mobile station and the base station has already been started via the radio-link.

(C-1) In the Case where the RAKE SIR Value Actually Received at the Base Station is Larger than the Target SIR Value:

This case includes not only the case where the RAKE SIR value becomes larger but also the case where the target SIR value becomes smaller relative to the RAKE SIR value.

The reception state is variable due to fazing or the like, because the communication between the base station and the mobile station is established via the radio-link. Therefore, in order to decrease such adverse effects of fazing or the like, the transmission power controller 125 in the base station monitors the state of the radio-link using only the first data series. Please note that it is unnecessary to use the second data series, because the second data series is also transmitted via the same radio-link as the first data series.

When the reception state is good and therefore the RAKE SIR value actually received at the base station is larger than the target SIR value, the transmission power controller 125 sets the TPC bit to "1" to decrease the transmission power level. The TPC bit is multiplexed with the forward-link data, in particular with the message data, and is sent to the TPC gain calculator 109 in the mobile station. Alternatively, the TPC bit may be multiplexed with the control data for the message data of the forward-link data.

The TPC gain calculator 109 in the mobile station receives the TPC bit separated from the forward-link data by the receiving AGC amplifier 107. When the TPC bit is "1", the TPC gain calculator 109 decreases the closed-loop gains for both the first data series and the second data series by 1.0 dB. In this way, the TPC gains from the TPC gain calculator 109 to the variable gain amplifiers 103 and 106 indicate that the transmission power is to be decreased by 1.0 dB, as long as the other gain factors remain unchanged. Subsequently, the transmission power levels for the first data series and the second data series are decreased.

(C-2) In the Case where the RAKE SIR Value Actually Received at the Base Station is Smaller than the Target SIR Value:

This case includes not only a case where the RAKE SIR value becomes smaller but also a case where the target SIR value becomes larger relative to the RAKE SIR value.

In this case, the transmission power controller 125 in the base station sets the TPC bit to "0". The TPC bit thus set is transmitted to the TPC gain calculator 109 in the mobile station via the radio-link. The TPC gain controller 109 operates to increase the closed-loop gains for both the first data series and the second data series by 1.0 dB, thereby increasing the TPC gains of the variable gain amplifiers 103 and 106 by 1.0 dB, as long as the other gain factors remain unchanged. Subsequently, the transmission power levels of the first data series and the second data series are increased.

(C-3) In the Case where the Relative SNR Difference Calculated by the Quality Adjuster 131 is 0 or More:

The case in which a plurality of data series with different required qualities is transmitted while being multiplexed on the same frequency (radio-link) will now be considered. When all the data series are transmitted at the same transmission power level, the transmission power level may be insufficient for transmitting one data series even though the transmission power level is sufficient for the other data series.

In this embodiment, control is performed to make the reception states of all data series approximately the same. More specifically, the quality adjuster 124 in the base station monitors the difference between the first relative SNR obtained for the first data series and the second relative SNR obtained for the second data series, and controls the MDF bit so that the reception state of the first data series is approximately the same as that of the second data series.

In the case where the relative SNR difference becomes 0 or more and the first relative SNR is larger than the second relative SNR, the reception state of the first data series is relatively good and therefore the difference between the measured SNR value and the required SNR value is considerably large. Therefore, the quality adjuster 124 in the base station sets the MDF bit to "1" so as to decrease the transmission power level for the first data series. Then, the MDF bit is multiplexed with the forward-link data, so as to be transmitted to the TPC gain calculator 109 provided at the mobile station. In this embodiment, the MDF bit is multiplexed with the message data. Alternatively, the MDF bit may be multiplexed with the control data for the message data.

When the TPC gain calculator 109 in the mobile station receives an MDF bit of "1", it decreases the closed-loop gain for the first data series by 0.1 dB. Therefore, the TPC gain supplied to the variable gain amplifier 103 is sent as an instruction to decrease the gain by 0.1 dB, as long as the other gain factors remain unchanged. Subsequently, the transmission power level for the first data series is decreased relative to the transmission power level for the second data series.

(C-4) In the Case where the Relative SNR Difference Calculated by the Quality Adjuster 131 is Less than 0:

In this case, regardless of the required quality of each data series and the reception state, the first relative SNR for the first data series becomes larger than the second relative SNR for the second data series.

The quality adjuster 124 in the base station sets the MDF bit to "0". The MDF bit thus set is multiplexed with the forward-link data and is transmitted to the TPC gain calculator 109 in the mobile station via the radio-link. The TPC gain calculator 109 increases the closed-loop gain for the first data series by 0.1 dB because the MDF bit is "0", so as to increase the TPC gain of the variable gain amplifier 103 by 0.1 dB, as long as the other gain factors remain unchanged. Subsequently, the transmission power level of the first data series is increased.

(D) The Advantageous Effects of the Present Embodiment:

As described above, in the mobile communication system according to the present embodiment, even if the first data series and the second data series, which are to be multiplexed and transmitted on the same frequency, have different required qualities, the transmission power level of the first data series is controlled in such a manner as to reduce the difference between the measured SNR and the required SNR for each data series. This realizes an efficient mobile communication system in which the communication qualities required for both the first and second data series are achieved and excessive power transmission for the respective data series can be prevented.

Thus, degradation of the communication quality and decrease of the transmission rate due to re-try control can be effectively avoided. Moreover, interference with other users can be also reduced, thereby effectively preventing any decrease in the number of simultaneous connections allowed.

(E) Modifications:

In the above embodiment, the transmission power levels of the data series on the reverse-link are controlled. Alternatively, the transmission power levels of the forward-link data series may be controlled. In this case, the base station transmits a plurality of series of data on the forward-link and the mobile station receives the transmitted data series. Then, the mobile station generates the TPC bit and the MDF bit as described in the above embodiment, multiplexes the TPC bit and the MDF bit with the data to be transmitted on the reverse-link, and transmits them to the base station. The base station controls the transmission power levels of the plurality of data series on the forward-link independently of each other, based on the TPC bit and the MDF bit.

Alternatively, transmission power control may be performed for both the reverse-link data and the forward-link data. In this case, the mobile station receives the TPC bit and the MDF bit transmitted together with the forward-link data and controls the transmission power levels of the data series on the reverse-link, while the base station receives the TPC bit and the MDF bit transmitted together with the reverse-link data and controls the transmission power levels of the data series on the forward-link.

Figure 5:
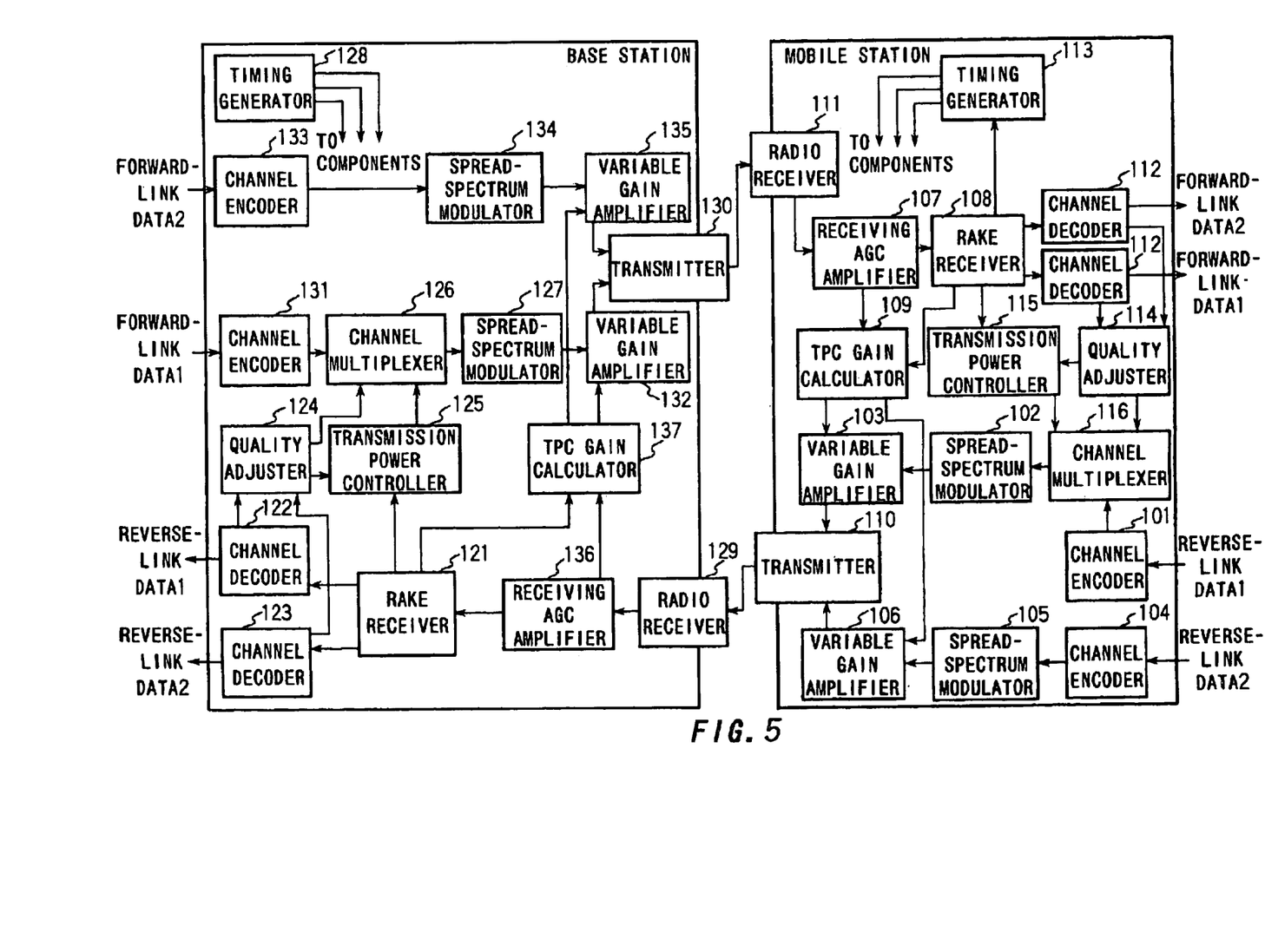
FIG. 5 is a block diagram showing the structure of a communication system according to another embodiment of the present invention.

FIG. 5 shows the detailed structure of the communication system in this modification. In this figure, the same reference numerals are used for components which are the same as those in FIG. 1, and detailed explanation of these components is omitted. Here, it is assumed that, on both the reverse-link and the forward-link, two series of data are transmitted.

In this modification, the reception portion of the mobile station is additionally provided with a quality adjuster 114 and a transmission power controller 115, which have the same structures as those of the quality adjuster 124 and the channel multiplexer 124 provided in the base station, respectively. Also, a timing generator 113 for supplying various timing signals to the components of the mobile station is added to the reception portion of the mobile station. As for the transmission portion of the mobile station, a channel multiplexer 116 having the same structure as that of the channel multiplexer 126 is added between the channel encoder 101 and the spread-spectrum multiplexer 102.

In the reception portion of the base station, a receiving AGC amplifier 136 and a TPC gain calculator 137, having the same structures as those of the receiving AGC amplifier 107 and the TPC gain calculator 109 in the mobile station, respectively, are added. As for the transmission portion of the base station, a channel encoder 133, a spread-spectrum modulator 134 and variable gain amplifiers 132 and 135 are added. All of the components in the base station operate based on the timing signals from the timing generator 128.

The transmission power control for the forward-link data is performed as follows: The RAKE receiver 108 separates the first data series and the second data series from each other and outputs them to the two channel decoders 112, respectively. Based on the outputs of the channel decoders 112, the quality adjuster 114 obtains the target SIR for the first data series on the forward-link and the MDF bit in the same manner as that described in the above embodiment. The target SIR is output to the transmission power controller 115 while the MDF bit is output to the channel multiplexer 116.

Further, the RAKE receiver 108 obtains the RAKE SIR for the first data series transmitted on the forward-link in the same manner as that described in the above embodiment and outputs the obtained RAKE SIR to the transmission power controller 115. The transmission power controller 115 obtains the TPC bit by calculation using the RAKE SIR from the RAKE receiver 108 and the target SIR supplied from the quality adjuster 114, and then outputs the obtained TPC bit to the channel multiplexer 116.

The channel multiplexer 116 multiplexes the TPC bit and the MDF bit, which are supplied from the transmission power controller 115 and the quality adjuster 114, respectively, with the first data series on the reverse-link that has been coded by the channel encoder 101. In this way, the TPC bit and the MDF bit for controlling the transmission power levels of the first and second data series on the forward-link are transmitted from the mobile station to the base station.

When the base station receives the TPC bit and the MDF bit for the forward-link data, the base station adjusts the transmission power levels of the forward-link data as follows. The RAKE receiver 121 separates the TPC bit and the MDF bit from the reception signal supplied from the receiving AGC amplifier 136 and outputs them to the TPC gain calculator 136. The TPC calculator 136 calculates the TPC gains appropriate for the variable gain amplifiers 132 and 135 based on the TPC bit and the MDF bit, as described in the above embodiment. The variable gain amplifiers 132 and 135, which are provided for the first data series and the second data series on the forward-link, respectively, have their gains changed, whereby the transmission power levels of the first data series and the second data series are adjusted independently of each other.

In the above embodiment, the MDF bit is set based on the relative SNR difference, i.e., the difference between the relative SNR values obtained for the first data series and the second data series. Alternatively, the MDF bit may be set as follows: First, the difference between the required FER value and the measured FER value for the first data series and the difference between the required FER value and the measured FER value for the second data series are obtained. Then, the difference between the above differences is obtained. The MDF bit is set so as to make this last-obtained difference smaller.

Further, in the above embodiment, the measured SNR value and the required SNR value are estimated based on the measured FER value and the required FER value, and then the MDF bit is set based on these estimated SNR values. However, if the SNR values can be directly obtained for the first data series and the second data series, the MDF bit may be set based on the actually obtained SNR values.

Similarly, if the required FER value and the measured FER value are directly obtained, the MDF bit may be set directly based on the obtained FER values. On the other hand, if the FER values are not obtained, then, after the required FER value and the measured FER value are estimated from the relationship between the required SNR value and the measured SNR value, the MDF bit may be set based on the thus estimated values.

Further, in the above embodiment, the MDF bit is used for controlling the transmission power level of the first data series. However, the same effects can be obtained in the case where the MDF bit is used for controlling the transmission power level of the second data series. Similarly, the same effects described in the above embodiment can be obtained in the case where the transmission power levels of the first data series and the second data series are controlled independently of each other.

Further, in the above embodiment, an example in which two series of data are multiplexed and transmitted is described. However, the present invention can be applied to the case where three or more series of data are multiplexed and transmitted. In this case, the transmission power levels of data series having different communication qualities may be controlled independently of each other.

Furthermore, although a communication system including a mobile station and a base station is described in the above embodiment, the communication system according to the present invention is not limited thereto.

In the above embodiment, the TPC bit and the MDF bit that cause to increase or decrease the transmission power levels are included in the control data that is to be transmitted from the mobile station to the base station. However, the TPC bit and the MDF bit may be multiplexed with the communication data itself, i.e., the message data which is to be transmitted.

Furthermore, in the above embodiment, the TPC bit causes to decrease or increase the gain by 1.0 dB and the MDF bit serves to decrease or increase the gain by 0.1 dB. However, the amount of the increment and the decrement due to the TPC bit and the amount of the increment and the decrement due to the MDF bit are not limited to these values.

In the above embodiment, the data specifying the relationships shown in FIGS. 3A and 3B is stored in the form of a table in the quality adjuster 124. Alternatively, instead of such tabular data, transformation equations specifying the relationships shown in FIGS. 3A and 3B may be stored and used to calculate the tabular data.

In the above embodiment, the relative SNR difference is defined as the result of subtracting the second relative SNR from the first relative SNR, and the MDF is set based on whether the relative SNR difference is a positive value or a negative value. However, the manner of setting the MDF bit is not limited to this. Any manner of setting may be used in the present invention as long as the transmission power levels are controlled so as to make the difference between the required quality and the actual received quality for one data series closer to the difference between the required quality and the actual received quality for the other data series.

In the above embodiment, the case in which the present invention is applied to a mobile communication system is described. However, the present invention can also be applied to communication between fixed stations, as long as the system is a communication system where a plurality of series of logical data having different required communication qualities are transmitted on a plurality of physical channels in a multiplexed manner.

Furthermore, in the above embodiment, the case in which the present invention is applied to a code-dividing multi-access (CDMA) communication system is described. However, the multiplexing method of a system to which the present invention is applied is not limited to a code-dividing multi-access (CDMA) system, as long as the system is a communication system where a plurality of series of logical data having different required communication qualities are transmitted on a plurality of physical channels in a multiplexed manner.

As described above, according to the present invention, a communication system includes: a first communication station for transmitting first data and second data at a first transmission power level and a second transmission power level, respectively; and a second communication station for receiving the first data and the second data transmitted from the first communication station. In this communication system, the second communication station generates transmission power control information based on the received first and second data, and transmits the generated transmission power control information to the first communication station, and the first communication station receives the transmission power control information from the second communication station, and controls the first transmission power level and the second transmission power level independently of each other based on the transmission power control information. This realizes a multiplexing communication system which allows the required qualities of the respective sets of data to be achieved while suppressing excessive power transmission.

What is claimed is:

1. A communication station for transmitting first data and second data, comprising:

an encoder for coding the first data and the second data;

a multiplexer for multiplexing the coded first data and the coded second data;

a transmitter for transmitting a signal including the first data and the second data that are multiplexed with each other to another communication station, the first data and the second data being transmitted at a first transmission power level and a second transmission power level, respectively; and a transmission power controller for receiving transmission power control information from the other communication station and for controlling one of the first transmission power level and the second transmission power level independently of the other, wherein the transmission power control information is generated in such a manner as to reduce a difference between a first difference between a required received quality and an actual received quality of the first data and a second difference between a required received quality and an actual received quality of the second data.

2. A communication station according to claim 1, wherein the transmission power control information includes first and second control bits; and wherein both a first gain for the first data and a second gain for the second data are changed based on the first control bit, and either the first gain or the second gain is changed based on the second control bit.

3. A communication station for transmitting first data and second data, comprising:

an encoder for coding the first data and the second data;

a multiplexer for multiplexing the coded first data and the coded second data;

a transmitter for transmitting a signal including the first data and the second data that are multiplexed with each other to another communication station, the first data and the second data being transmitted at a first transmission power level and a second transmission power level, respectively; and a transmission power controller for receiving transmission power control information from the other communication station and for controlling one of the first transmission power level and the second transmission power level independently of the other;

wherein the transmission power control information includes first and second control bits;

wherein both a first gain for the first data and a second gain for the second data are changed based on the first control bit, and either the first gain or the second gain is changed based on the second control bit, and wherein both the first gain and the second gain are changed by a first value and either the first gain or the second gain is changed by a second value, the first value being larger than the second value.

4. A communication station according to claim 3, wherein the first value is 1 dB and the second value is 0.1 dB.

5. A communication station for receiving first data, and second data transmitted from another communication station, the first data and the second data being transmitted at a first transmission power level and a second transmission power level, respectively, the communication station comprising:

a receiver for receiving a signal including the first data and the second data;

a processor for decoding the first data and the second data;

a control information generator for generating transmission power control information based on the first data and the second data received by the receiver, the transmission power control information causing control of one of the first transmission power level and the second transmission power level independently of the other; and a transmitter for transmitting the transmission power control information to the other communication station;

wherein the first data and the second data are multiplexed with each other; and wherein the transmission control information is generated in such a manner as to reduce a difference between a first difference between a required received quality and an actual received quality of the first data and a second difference between a required received quality and an actual received quality of the second data.

6. A communication station according to claim 5, wherein the required received quality and the actual received quality of both the first data and the second data are represented by a frame error rate.

7. A communication station according to claim 5, wherein the required received quality and the actual received quality of both the first data and the second data are represented by a signal-to-noise ratio.

8. A communication station according to claim 5, wherein the transmission power control information includes a first control bit generated based on the first data and a second control bit based on both the first data and the second data, and the first control bit is transmitted to the other communication station more frequently than the second control bit.

9. A communication station according to claim 8, wherein the first control bit is transmitted at intervals of 1.25 ms, while the second control bit is transmitted at intervals of 80 ms.

10. A communication station according to claim 9, wherein the second control bit is transmitted in such a manner that the first control bit is replaced with the second control bit at intervals of 80 ms.

11. A communication station according to claim 10, wherein the second data is transmitted in synchronization with a start of a frame of the first data.

12. A communication station according to claim 11, wherein the second data is transmitted at a timing corresponding to a portion of a frame other than a header portion or an end portion.

13. A communication station for transmitting first data and second data on a reverse-link and for receiving third data and fourth data on a forward-link in response to the first data and the second data, the communication station comprising:
 a coder for coding the first data and the second data;
 a multiplexer for multiplexing the coded first data and the coded second data with each other;
 a transmitter for transmitting a signal including the first data and the second data that are multiplexed with each other to another communication station, the first data and the second data being transmitted at a first transmission power level and a second transmission power level, respectively;
 a receiver for receiving the third data and the fourth data;
 a processor for separating transmission power control information from the third data and the fourth data;
 a transmission power controller for controlling one of the first transmission power level and the second transmission power level independently of the other, based on the separated transmission power control information; and
 a control information generator for generating further transmission power control information based on reception states of the third data and the fourth data, the further transmission power control information causing control of one of the third transmission power level and the fourth transmission power level independently of the other, wherein the further transmission power control information is transmitted together with the first data and the second data.

14. A communication system comprising:
 a first communication station for transmitting a signal including first data and second data at a first transmission power level and a second transmission power level, respectively; and
 a second communication station for receiving the first data and the second data transmitted from the first communication station;
 wherein the second communication station generates transmission power control information based on the received first and second data, and transmits the generated transmission power control information to the first communication station;
 wherein the transmission power control information is generated in such a manner as to reduce a difference between a first difference between a required received quality and an actual received quality of the first data and a second difference between a required received quality and an actual received quality of the second data;
 wherein the first communication station receives the transmission power control information from the second communication station, and controls one of the first transmission power level and the second transmission power level independently of the other based on the transmission power control information; and
 wherein the first data and the second data are multiplexed with each other.

15. A communication system according to claim 14, wherein the first communication station includes a transmission power controller that controls a first gain of the first data and a second gain of the second data independently of each other, thereby controlling the first transmission power level and the second transmission power level.

16. A communication system according to claim 15, wherein the transmission power control information includes first and second control bits, and
 the transmission power controller of the first communication station changes both the first gain and the second gain based on the first control bit by a first value, and changes either the first gain or the second gain by a second value based on the second control bit.

17. A communication system comprising:
 a first communication station for transmitting a signal including first data and second data at a first transmission power level and a second transmission power level, respectively; and
 a second communication station for receiving the first data and the second data transmitted from the first communication station;
 wherein the second communication station generates transmission power control information based on the received first and second data, and transmits the generated transmission power control information to the first communication station; and
 wherein, the first communication station receives the transmission power control information from the second communication station, and controls one of the first transmission power level and the second transmission power level independently of the other based on the transmission power control information;
 wherein the first data and the second data are multiplexed with each other;
 wherein the first communication station includes a transmission power controller that controls a first gain of the first data and a second gain of the second data independently of each other, thereby controlling the first transmission power level and the second transmission power level;
 wherein the transmission power control information includes first and second control bits;

wherein the transmission power controller of the first communication station changes both the first gain and the second gain based on the first control bit by a first value, and changes either the first gain or the second gain by a second value based on the second control bit; and wherein the first value is larger than the second value.

18. A communication system according to claim 17, wherein the first value is 1 dB and the second value is 0.1 dB.

19. A communication system according to claim 18, wherein the second communication station generates the transmission power control information in such a manner as to make a first difference between a required received quality and an actual received quality of the first data closer to a second difference between a required received quality and an actual received quality of the second data.

20. A communication system according to claim 19, wherein the required received quality and the actual received quality of both the first data and the second data are represented by a frame error rate.

21. A communication system according to claim 19, wherein the required received quality and the actual received quality of both the first data and the second data are represented by a signal-to-noise-ratio.

22. A communication system according to claim 19, wherein the second communication station generates the first control bit based on the first data and the second control bit based on both the first data and the second data, and transmits the first control bit to the first communication station more frequently than the second control bit.

23. A communication system according to claim 22, wherein the first control bit is transmitted at intervals of 1.25 ms, while the second control bit is transmitted at intervals of 80 ms.

24. A communication system according to claim 23, wherein the second control bit is transmitted in such a manner that the first control bit is replaced with the second control bit at intervals of 80 ms.

25. A communication system according to claim 24, wherein the second control bit is transmitted in synchronization with a start of a frame of the first data.

26. A communication system according to claim 24, wherein the second control bit is transmitted at a timing corresponding to a portion of a frame other than a header portion or an end portion.

27. A communication system comprising:
a first communication station for transmitting a signal including first data and second data at a first transmission power level and a second transmission power level, respectively; and
a second communication station for receiving the first data and the second data transmitted from the first communication station,
wherein the second communication station generates transmission power control information based on the received first and second data and transmits the generated transmission power control information to the first communication station;
wherein the first communication station receives the transmission power control information from the second communication station, and controls one of the first transmission power level and the second transmission power level independently of the other based on the transmission power control information;
wherein the first data and the second data are multiplexed with each other;

wherein the second communication station transmits third data and fourth data at a third transmission power level and a fourth transmission power level, respectively, to the first communication station; and
wherein the first communication station generates a further transmission control information for controlling the third transmission power level and the fourth transmission power level, and the second communication station controls the third transmission power level and the fourth transmission power level independently of each other based on the further transmission power control information from the first communication station.

28. A communication system according to claim 27, wherein the second communication station transmits the transmission power control information to the first communication station in such a manner that the transmission power control information is conveyed with either the third data or the fourth data.

29. A communication system according to claim 28, wherein the first communication station transmits the further transmission power control information for the third data and the fourth data to the second communication station in such a manner that the further transmission power control information is conveyed with either the first data or the second data.

30. A communication system according to claim 29, wherein the second communication station controls a third gain of the third data and a fourth gain of the fourth data independently of each other, thereby controlling the third transmission power level and the fourth transmission power level.

31. A communication system according to claim 30, wherein the further transmission power control information generated by the first communication station includes third and fourth control bits, and
wherein the second communication station changes both the third gain and the fourth gain based on the third control bit by a third value, and changes either the third gain or the fourth gain by a fourth value based on the fourth control bit.

32. A communication system according to claim 31, wherein the third value is larger than the fourth value.

33. A communication system according to claim 32, wherein the third value is 1 dB and the fourth value is 0.1 dB.

34. A communication system according to claim 33, wherein the further transmission control information is generated in such a manner as to reduce a difference between a third difference between a required received quality and an actual received quality of the third data and a fourth difference between a required received quality and an actual received quality of the fourth data.

35. A communication system according to claim 34, wherein the required received quality and the actual received quality of both the third data and the fourth data are represented by a frame error rate.

36. A communication system according to claim 35, wherein the required received quality and the actual received quality of both the third data and the fourth data are represented by a signal-to-noise ratio.

37. A communication system according to claim 36, wherein the first communication station generates the third control bit based on the third data and the fourth control bit based on both the third data and the fourth data, and transmits the third control bit to the second communication station more frequently than the fourth control bit.

38. A communication system according to claim 37, wherein the third control bit is transmitted at intervals of 1.25 ms, while the fourth control bit is transmitted at intervals of 80 ms.

39. A communication system according to claim 38, wherein the fourth control bit is transmitted in such a manner that the third control bit is replaced with the fourth control bit at intervals of 80 ms.

40. A communication system according to claim 39, wherein the fourth control bit is transmitted in synchronization with a start of a frame of the first data.

41. A communication system according to claim 39, wherein the fourth control bit is transmitted at a timing corresponding to a portion of a frame other than a header portion or an end portion.

42. A communication system according to claim 37, wherein both the first data and the third data are message data, and both the second data and the fourth data are control data for the message data.

43. A communication system according to claim 36, wherein both the second data and the fourth data are message data, and both the first data and the third data are control data for the message data.

* * * * *